Aug. 4, 1936.　　　　E. D. GAGE　　　　2,049,801
COUPLING FOR OVERHEAD IRRIGATION PIPES
Filed Aug. 6, 1935
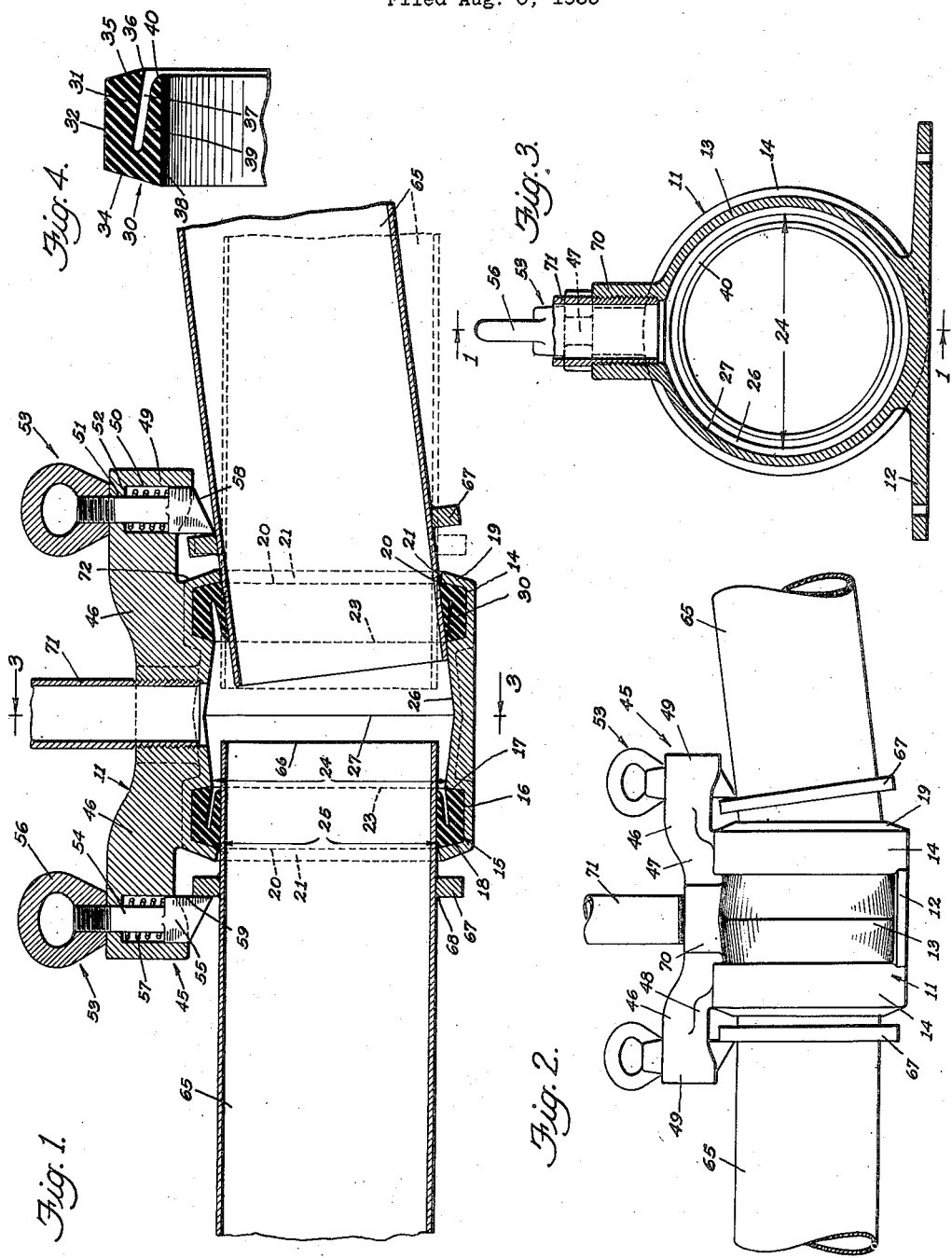
Inventor
E. D. Gage
By Hazard and Miller
Attorneys Patented Aug. 4, 1936

2,049,801

UNITED STATES PATENT OFFICE 2,049,801

COUPLING FOR OVERHEAD IRRIGATION PIPES

Ellsworth D. Gage, Oakland, Calif.

Application August 6, 1935, Serial No. 34,900

3 Claims. (Cl. 285—193)

My invention relates to a type of water-tight coupling, such as may be used for irrigation pipes, in which the coupling element has provision for an overhead sprinkler. The main coupling element includes a packing ring which forms a water-tight seal with a cylindrical pipe, the end of which is inserted in the coupling.

An object and feature of my invention of the above type of coupling assembly, embodies a construction by which the end of a cylindrical irrigation pipe may be readily inserted in the coupling and in such insertion engaging a resilient packing ring or packing cup; the amount of insertion of the pipe in the coupling being stopped by a collar fixedly secured to the pipe, such collar engaging the coupling.

A further feature of my invention relates to a latch, this latch being automatically raised on insertion of the pipe by means of the coupling and then after the coupling has passed the latch, a spring extends the latch to engage the collar and thus retains the end of the pipe in the coupling.

A further feature of my invention relates to the interior construction of the coupling this having diverging cone surfaces, the divergence being from the packing cup whereby for a double ended coupling the largest interior diameter of the coupling is at the center. This construction permits a pipe to have its axis tilted or inclined at an angle to the axis of the coupling and thus in effect to make an angular joint between, for instance, one of the pipes in the coupling and the coupling and the other pipe. By having the interior surface coned outwardly in an enlarging diverging surface, a limiting line contact may be formed between one portion of the pipe and a portion of the outwardly diverging interior surface of the coupling. This contact with the engagement of the latch and the collar of the pipe effectively locks the pipe from further tilting and from outward movement relative to the coupling on introduction of water pressure in the coupling by transmission of water through the coupling or use of portions of the water for overhead irrigation.

A further detail feature of my invention relates to the packing cup and its mounting in the coupling. The packing cup is made of rubber, having a cylindrical outside surface which engages a cylindrical inside surface of an annular groove in the coupling. This groove has outwardly tapered sides engaging complementary inside and outside edges of the packing cup or ring. The ring is provided with an annular split or groove, this groove being at a slight angle to the outside peripheral surface of the ring and thus leaving a flexible tongue terminating in a thin fin or feather edge. This fin and feather edge engage the outside surface of the inserted pipe so that when an internal pressure is built up in the coupling, the water may enter the groove of the washer and expand the fin and feather edge to form a water-tight seal on the exterior of the pipe.

A detail feature of my invention as it relates to the latch, is that this is in the form of a latch bolt having a stem slidably mounted in a guide perforation through longitudinally projecting lugs in the coupling. The latch bolt has a bevelled head, the bevel engaging the collar on inserting a pipe in the coupling. Such action causes a receding movement of the latch bolt compressing a spring in a recess in the lug, the spring reacting after the collar passes the bevel head to project the head outwardly and thereby engage the outside surface of the collar.

A further detail feature resides in providing the latch bolt with an eye so that by means of a hook it may be readily retracted for removal of the pipes from the coupling.

My invention is illustrated in connection with the accompanying drawing, in which, Fig. 1 is a longitudinal section through the assembly of the coupling pipes and may be considered on the section line 1—1 of Fig. 3 in the direction of the arrows.

Fig. 2 is a side elevation.

Fig. 3 is a transverse section on the line 3—3 of Fig. 1 in the direction of the arrows.

Fig. 4 is a longitudinal section through a portion of the packing ring or cup.

In my invention I employ a coupling unit 11 which is formed preferably of a lightweight casting. This is provided with a shoe or foot 12 extending transversely to support the coupling to prevent overturning. The coupling has a central hollow body structure 13 and a pair of end annular projections 14 in which are formed the annular recesses or grooves 15. The grooves have a cylindrical surface 16, an inner tapering surface 17 and an outer tapered surface 18; this being on the inside of the rim or lip 19. This lip has an inner edge 20 and an outwardly bevelled face 21. The inner surface 17 of the groove terminates in a circular edge 23 and the diameter 24 formed by the edge 23 is greater than the diameter 25 of the edge 20.

The interior of the central body portion has two cone-shaped diverging surfaces 26, diverging from the edge 23 to the center 27; this center being the internal portion of largest diameter between the edges 23. Each of the surfaces 26 thus forms a frustum of a cone, the base being at the center and the top of the frustum being on the line 23.

A packing ring or cup 30 (note Figs. 1 and 4) is preferably formed of rubber and has a main outer body portion 31 having a cylindrical outside surface 32, an outside edge 34 and an inside edge 35. The edge 35 terminates at the circular inner edge 36. The washer has a deep annular groove or slit 37 between the outside cylindrical surface 32 and the inside cylindrical surface 38, thus leaving a tongue or fin 39 between the slit and the inside surface 38. This tongue terminates in a feather edge 40, this edge being set inwardly from the edge 36.

The cup washer is inserted in the annular groove 15 and is of such proportions that the outside cylindrical surface 32 bears against the cylindrical surface 16 of the groove. The edge 34 engages the outwardly sloping surface 18 but is of slightly greater length than this surface. The inside surface 35 of the ring engages the surface 17 of the groove, the edge 36 terminating substantially at the edge 23 of the coupling structure. This arrangement permits the tongue to occupy a readily flexible position with the surface 38 substantially cylindrical before the introduction of the pipes.

The latching assembly 45 employs two lugs 46 which extend longitudinally of the body structure of the coupling unit, these being preferably formed with a vertical rib 47. Horizontal flanges 48 terminate in a circular end 49. This end has a rectangular recess 50, a perforation 51 thereabove, thus forming a shoulder 52. The latch 53 consists of a cylindrical latch bolt 54 sliding through the perforation 51 and having a bevelled latch head 55 on the lower end; an eye 56 is secured to the upper end of the bolt. A compression spring 57 bears against the shoulder 52 and the head 55. The head is rectangular and is guided in the recess 50 so that it cannot rotate. Thus the bevel surface 58 is always positioned remote from the center portion of the coupling unit and the inner face 59 of the head is at right angles to the axis of the coupling unit.

The pipes 65 are slightly less in diameter than the measurement 25 of the opening formed by the edge 20 of the rim or lip 19 so that as the leading end 66 is inserted in the end 19, the bevel surface 21 may act as a guide in centering the pipe end. The pipe slips freely in the cylindrical inside surface 38 of the cup packing washer, the limit to the insertion being by means of a collar 61 which is secured to the pipe by fillet welds 68 engaging the rim 19. There is a sufficient space between the rim 19 and the face 59 of the bevel heads of the latch to allow a slight adjustment and angular positioning of the pipe in reference to the coupling. When the pipe is being inserted the collar engaging the bevel 58 forces the latch bolt upwardly, thereby compressing the spring 57, which after the collar has passed the latch head, again projects the head to engage on the inside of the collar 67.

When a pipe is inserted it may tilt to a limiting angle indicated in Fig. 1 for the right hand pipe, in which the lower portion of the pipe has a substantially line contact with the lower side of the outwardly coned surface 26. The portion of the pipe spaced slightly from the collar engages the upper part of the bevel 21 of the lip 19, also at substantially a line contact, the cup washer being slightly compressed at the top adjacent the outside edge 34. At the bottom portion of the ring, the lip 39 and the feather edge 41 are pressed outwardly towards the body of the ring.

When water is passed through the pipes under pressure, the water fills the groove 37 of the cup ring and expands the tongue or fin 39 outwardly against the pipe; the feather edge 40 giving a tight seal on the cylindrical exterior of the pipe.

When it is desired to use the coupling for overhead irrigation, I provide a hollow boss 70 on the upper portion of the central part 13 of the coupling, this boss forming the inner terminus for the webs 47 and an irrigation standpipe 71 is threaded into the boss. Such standpipes usually have rotatable nozzles. It will be noted that when the coupling with the two pipes is under water pressure, that the pipes are forced outwardly until the collars contact with the bevel heads of the latch bolts, which gives sufficient space between the inner ends 66 of the two pipes to afford a cross sectional area for the flow of water to the standpipe. The pipes are also filled to their full diameter for transmitting water to other couplings or the like for irrigation purposes. Manifestly if the pressure does not force the pipes outwardly, or these are connected to other couplings, the collars may fit close to the lip 19 of the main portion of the coupling and for this purpose the lip has a receding bevel 72 on its outside surface and thus accommodating a tilt of the collar 67 when the pipe is tilted. It will be seen therefore that my invention provides a considerable flexibility as to angular adjustments of the two pipes.

Also by my construction the pipes may be quickly connected to the coupling by merely thrusting the ends of the pipes in the open ends of the coupling, this causing the automatic recision and projection of the latch bolts. Then when it is desired to remove the pipes from the coupling, the latch bolts may be retracted by engaging a hook in the eye 56 and thus raising the latch sufficiently to permit the collar 67 passing underneath the latch in pulling the pipe longitudinally out of the coupling.

Various changes may be made in the details of construction without departing from the spirit or scope of the invention as defined by the appended claims.

I claim:

1. In a coupling unit having a casing provided with a plurality of openings, means for the reception of pipes in the openings in flexible relation to the casing, means in the casing for supporting a portion of the surface of the inner ends of the pipes when in extreme angular position and like means for supporting a portion of the surface of the pipe at the place of entry into the casing.

2. A coupling assembly consisting of a coupling housing having a hollow body portion and having frustro-conically shaped inner surfaces diverging from the edge of the housing to the center thereof, outwardly extending hollow sockets having outwardly divergent inner edge surfaces and pipes adapted to be inserted into the sockets in flexible relation thereto, the surfaces bearing against portions of the surface of the pipe when the pipe is in extreme angular position.

3. A coupling assembly consisting of a coupling housing having a hollow body portion and having frustro-conically shaped inner surfaces diverging from the edge of the housing to the center thereof, outwardly extending hollow sockets in communication with the housing and having outwardly diverging inner edge surfaces and inwardly tapering lips and pipes having annular collars and adapted to be inserted into the sockets in flexible relation thereto, the conical and edge surfaces bearing against portions of the surface of a pipe and the collar bearing against the lip when a pipe is in extreme angular position.

ELLSWORTH D. GAGE.